United States Patent [19]
Laimins

[11] 3,797,302
[45] Mar. 19, 1974

[54] ON-BOARD AIRCRAFT WEIGHT TRANSDUCER WITH MECHANICAL OFFSET ADJUSTMENT
[75] Inventor: Eric Laimins, Belmont, Mass.
[73] Assignee: BLH Electronics, Inc., Waltham, Mass.
[22] Filed: June 21, 1972
[21] Appl. No.: 264,941

[52] U.S. Cl. ................................................. 73/88.5
[51] Int. Cl. ............................................... G01l 1/22
[58] Field of Search .......... 73/88.5 R, 1 B, 65, 100; 338/6; 33/143 L

[56] References Cited
UNITED STATES PATENTS
3,464,259   9/1969   Farr .................................. 73/88.5 R
3,327,270   6/1967   Garrison ......................... 73/88.5 R Primary Examiner—Jerry W. Myracle
Attorney, Agent, or Firm—James E. Mrose

[57] ABSTRACT

An externally-mounted strain-gage transducer for sensing aircraft weight components in response to load-induced deformations of a support such as an axle, truck beam, or the like, is of an elongated form with end lugs designed for bolting to cooperating horizontally-spaced lugs integral with the support, the transducer end lugs each being provided with an adjustably-deformable hole-and-slot type symmetrical flexural connection by which the transducer ends may be raised or lowered wholly in the desired vertical direction to offset effects such as those of otherwise-unavoidable installation zero shift.

8 Claims, 4 Drawing Figures

ON-BOARD AIRCRAFT WEIGHT TRANSDUCER WITH MECHANICAL OFFSET ADJUSTMENT

BACKGROUND OF THE INVENTION

The present invention relates to improvements in the precision measurement of vehicle loadings, such as those which are characterized in the external deformations of axles or truck beams of aircraft and the like, and, in one particular aspect, to novel and improved external on-board aircraft weighing transducers which are lug-mounted to the exteriors of landing-gear structure by way of substantially rigid and yet adjustably-deformable connections permitting compensatory mechanical displacements of the transducer to be introduced and maintained accurately.

The art of weighing and calculating center-of-gravity of aircraft in response to measurements of weight-induced elastic distortions of their supports has been well developed, and has included evolutions of strain-gaged sensing devices designed for both external and internal mounting in relation to support structures such as axles. With knowledge of the weights effective at each of the points of support by the various landing gear, both total craft weight and locus of its c.g. can readily be calculated, by way of associated computing networks, as important aids to safe and efficient aircraft operation. Similarly, loadings of other type of vehicles can be determined using comparable "on-board" or permanently-installed sensors.

An underlying principle associated with many of such sensors or transducers is that an auxiliary elastically-deformable gaged element, such as a miniature beam, can be made to witness minute deformations related to those of one section of an axle, for example, if it is very securely fastened with that support at a pair of horizontally-spaced positions, and that these elastically-observed deformations can in turn cause appropriately-located electrical strain gages to develop bridge signals which will precisely characterize the weight being sustained via that axle. Various means have been provided for making the needed secure fastenings, which are essential to repeatability of performance and which must be capable of withstanding severe shock and vibration as well as other harsh environmental conditions of use. Inevitably, however, the installation of such transducers by way of such fastenings entails some misalignments or distortions or lack of mechanical precision, with the result that the prefabricated transducers exhibit strains erroneously simulating conditions to be measured, or socalled "installation zero shift." In some situations the problems are compounded by the need to offset the effects of tare, i.e., to have the transducer itself make allowance for the unloaded weight of the vehicle.

Transducers of the type under discussion are intended to respond to vertical components of loading forces, such that spurious forces unrelated to weight will not cause measurement error. Likewise, it is comparably important that the transducers not be twisted or bent in directions which could lead to such error when the transducer is somehow mechanically compensated to offset the aforementioned installation zero shift or tare. Other known techniques for attempting such mechanical compensation have included interleaved washers which could be squeezed into a tightened and locked coupling between the end of a transducer and its support (U.S. Pat. No. 3,426,586), and an adjustable set screw for deflecting the end of a cantilevered beam (U.S. Pat. No. 3,327,270), and an adjustable wedge-shaped pre-load bolt for shifting positions of a pre-load finger at the end of a cantilevered bar (U.S. Pat. No. 3,494,181), and adjustable colleting for an inside-axle transducer (U.S. Pat. No. 3,625,053). Those transducer-support arrangements which involve separate relatively-movable parts are prone to difficulty in that severe shock, vibration and extremes of temperature can readily cause them to fall out of proper adjustment, and, accordingly, the present teachings are concerned with improved supports involving wholly integral connection members, the related needs for fine positional trimming being accommodated by way of adjustable symmetrical flexures which advantageously avoid movements of the transducer in unwanted directions.

SUMMARY

It is one of the objects of the present invention to provide novel and improved support of on-board weight transducers, involving a high degree of structural integrity while at the same time enabling precise adjustments for compensation of installation zero shift and/or tare.

A further object is to provide relatively simple and low-cost transducer-mounting connections in which flexures associated with expandible or compressible slotting integrally couple the ends of a transducer with its support and are minutely deformable to move the transducer ends only in substantially one plane for purposes of introducing compensating mechanical offsets.

By way of a summary account of practice of this invention in one of its aspects, an aircraft landing-gear truck beam or the like, equipped with a pair of horizontally-spaced external integral mounting lugs, is united with a generally-elongated transducer having electrical-resistance strain gages bonded to selected surfaces, each end of the transducer being joined with a substantially rigid connector shaped for bolting with one of the mounting lugs, and each such connector having a horizontal slot dividing a portion between the positions of the lug and transducer-end junctions into two vertically-spaced symmetrical flexures; spreading or compressing the slot, by way of an adjustable bolt, causes the associated transducer end to be moved slightly only in substantially the vertical direction, with consequent adjustment of the stressed state of the installed transducer.

BRIEF DESCRIPTION OF THE DRAWINGS

Although the aspects and features of this invention which are considered to be novel are expressed in the appended claims, further details as to preferred practices and as to the further objects and features thereof may perhaps be most readily comprehended through reference to the following description taken in connection with the accompanying drawings, wherein:

DESCRIPTION OF THE PREFERRED EMBODIMENTS

Figure 1:
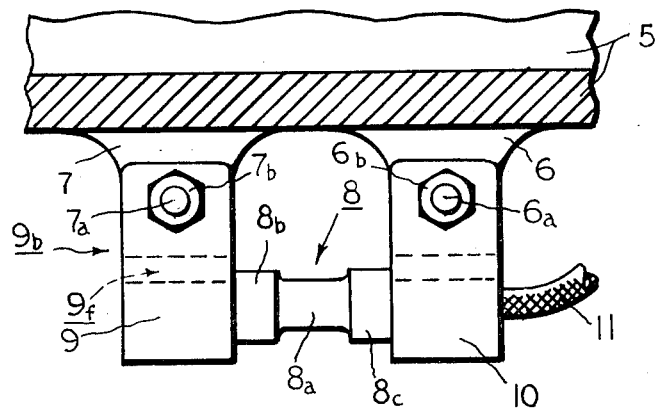
FIG. 1 is a top plan view of part of an aircraft truck beam, partly in cross-section, having external lugs mounting a strain-gage transducer by way of connectors affording offset in accordance with the present invention.
Figure 2:
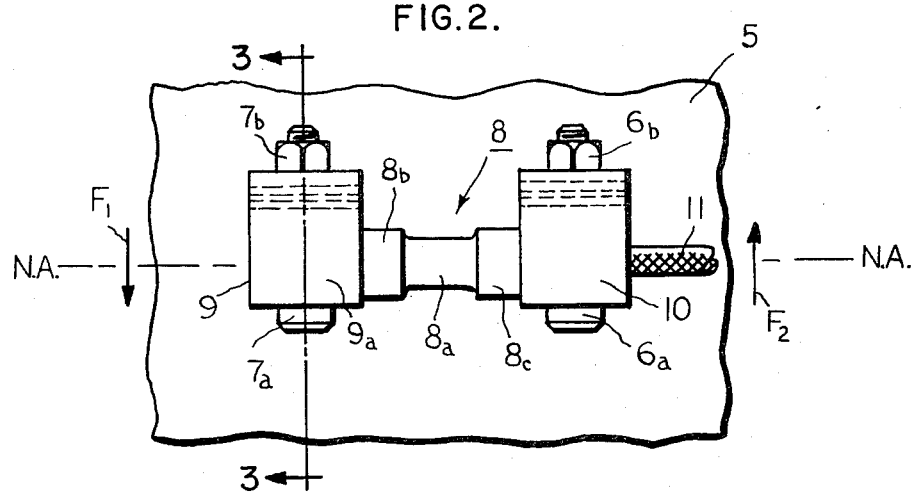
FIG. 2 provides a side view of the assembly shown in FIG. 1.
Figure 3:
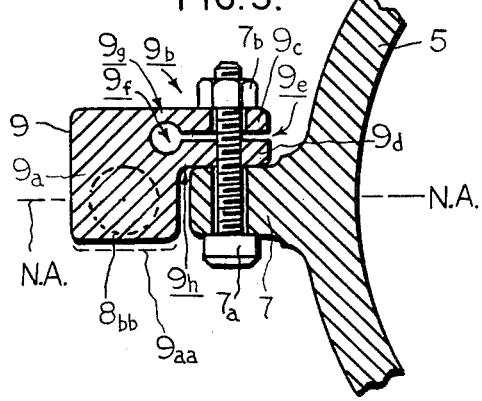
FIG. 3 is a partly cross-sectional transverse view of the same assembly, taken along section line 3—3 in FIG. 2.

In the assembly appearing in FIGS. 1–3, weight responses of a vehicle-supporting structure 5, shown specifically as part of an aircraft landing-gear truck beam, exhibit themselves as minute deflections of that beam, whereby, at longitudinally-spaced horizontal positions of the integral external lugs 6 and 7, there will be relative displacements, in the vertical directions, which can be sensed by an externally-mounted horizontal elongated strain-gaged transducer 8 fixed securely with those two lugs. A truck beam of the type under consideration, or a corresponding axle of an aircraft or other vehicle, is normally disposed in a substantially horizontal orientation, between the body of the vehicle and the underlying ground surface on which its rests, and an optimum location for the associated elongated horizontal transducer is in the horizontal plane including the neutral axis of the beam or axle. That neutral axis lies in the plane defined by the lines N.A.-N.A. in FIGS. 2 and 3, and, in accordance with one preferred practice, another corresponding transducer, supported on like lugs, is mounted (not shown) at the diametrically-opposite position along the same beam or axle. In one aircraft construction, beam 5 may have an outer diameter of about 9 inches, is hollow, and has a wall thickness of about ½ inch.

Although it is theoretically possible to determine weight responses by way of strain gages applied directly to an axle, rather than to employ auxiliary transducers, the latter approach is preferable for well-known reasons in many cases, among these being the facts that critical gage placements and bonding and the wiring and fastening of associated cabling can best be achieved under closely-controlled manufacturing conditions, and that known transducers of various configurations can better develop the kinds and locations of strains which lend themselves to optimum gaging and translations of strains into desired measurements. Transducer 8, although not intended to be limited to a particular configuration, may, for example, have a relatively deformable sensing mid-section element 8a which is of simple rectangular steel beam form, or may be of another configuration such as that of the parallelogram-beam described in my U.S. Pat. No. 2,866,059; the associated gaging (not shown) of such an element is in accordance with known practices, as is also the electrical bridge circuitry or the like associated with measurement indications via such gages. Transducer mid-section 8a is integral with more rigid force-transmitting end portions, 8a and 8c, by which the deformations within elastic limits of the nearby portion of beam 5 are to be translated into related deformations of that section, and, for the latter purposes, those end portions must of course be held in rigorously fixed relation to the two beam lugs 6 and 7.

The transducer unit is capable of installation and removal from the lugs, because of the fastenings thereto by way of bolts 6a and 7a, but, rather than being fastened directly to the end portions 8b and 8c, these bolts are instead secured to yet further transducer end parts, 9 and 10, which are of a predetermined split configuration affording limited adjustability in the mounting. End parts 9 and 10 serve as substantially rigid connectors for transducer rigid end portions 8b and 8c, respectively, and the latter may be welded integrally with them or otherwise immovably fixed with them; the locus of one of these, 8b, in relation to connector 9, is shown by dashed line-work 8bb in FIG. 3. From the latter FIGURE, it is evident that the transducer end part 8b is united with the main body 9a of the connector, but that this main body is in dependent relation to a bifurcated portion 9b consisting of branches 9c and 9d separated by a slot 9e and further having the inner end of the slot stress-relieved by a larger transversely-drilled hole 9f. The lower one of these branches, 9d, abuts the top of truck-beam lug 7, and is held securely with it as the result of its threaded connection with lug 7a. The companion upper branch, 9c, is capable of being compressed downwardly by a nut 7b on the same bolt, 7a, which passes freely through an accommodating hole in branch 9c. As the nut 7b is tightened, the two branches 9c and 9d of the bifurcated portion are drawn closer together, that action being accommodated by the two flexures 9g and 9h developed between hole 9f and the upper and lower surfaces of that bifurcated portion. Because lower branch 9c is held fixed in relation to the lug 7, the resulting displacement must be downward and main body protion 9a is thus shifted downwardly, as characterized by dashed linework 9aa, carrying transducer end part 8b with it. Connector 10 is constructed similarly, and functions comparably, whereby transducer end part 8c may be displace downwardly by controlled amounts by way of its associated adjusting nut 6b.

When the transducer is being installed, the bolts 6a and 7a are tightened to secure the end connectors 10 and 9 with beam lugs 6 and 7, and, because of such factors as the likelihood that these lugs may not have perfect alignment with the transducer connectors, the gages of the distorted transducer will tend to cause erroneous output to appear where none should be present. Cabling 11 connects the transducer gages to remote electrical indicating circuitry to develop these outputs. One or both of nuts 7b and 6b is then tightened, and the resulting downward displacements of the transducer ends will cause the distortion to be offset and the erroneous "installation zero shift" to be compensated. Importantly, this adjustment procedure entails displacements of the transducer ends only in one direction, namely the vertical in the case under discussion, such that the transducer is not twisted or bent in other error-inducing directions. Force arrows F1 and F2 in FIG. 2 characterize load-induced forces which the deflected truck beam may exert upon the installed transducer. In those cases where it is desired to offset the unloaded vehicle weight or " tare" forces, the same kind of nut adjustments as have just been described also provide a means for so doing.

Figure 4:
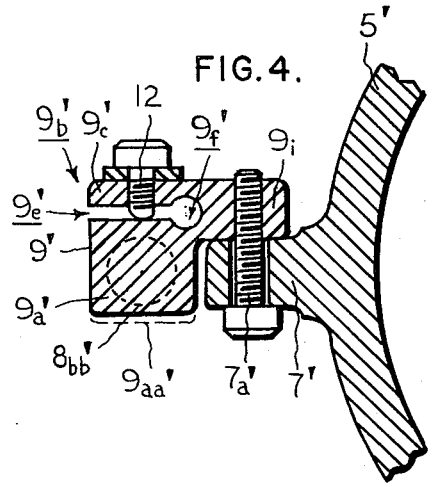
FIG. 4 is a partly cross-sectioned transverse view, comparable to that of FIG. 3, of a like assembly including a modified version of an adjustable connector between the truck beam and transducer.

The modification exemplified in FIG. 4 illustrates a generally similar arrangement in which, for convenience, certain of the same or functionally corresponding portions are designated by the same reference characters employed in the preceding FIGURES, with distinguishing single-prime accents added. There, the main body 9a' of one of the transducer end connectors 9' itself forms one of the branches (lower) of a bifurcated portion 9b', and the top brance 9c' is separated from it by the slot 9e' and the associated drilled hole 9f'. The relatively rigid junction of these two branches, 9i, is secured to truck-beam lug 7' by the bolt 7a'. When a set screw 12, threadedly engaged with branch 9c', is tightened to spread the two branches, the main body part 9a' necessarily moves downwardly somewhat, to a position characterized by dashed linework 9aa', while the upper branch moves upwardly, and, as before, a mechanical offset is achieved for compensation for installation zero shift and/or tare.

Preferably, the two branches of the bifurcated portion of each adjustable connector are joined together and with the remaining part of the connector by way of flexures, such as 9g and 9h in FIG. 3, which are substantially the same, or symmetrical, mechanically. However, similar effects can be realized without perfect symmetry.

It should be understood that the specific practices and preferred embodiments herein referred to have been offered by way of disclosure rather than limitation, and that various modifications, additions and substitutions may be effected by those skilled in the art without departure from these teachings; it is therefore aimed in the appended claims to embrace all such variations as fall within the true spirit and scope of this invention.

What I claim as new and desire to secure by letters Patent of the United States is:

1. On-board vehicle weight transducer apparatus responsive to elastic deformation of a support such as a truck beam or axle for the vehicle, comprising an elongated transducer including a relatively deformable strain-gaged element and relatively rigid connectors at the ends of said element, means for securing said connectors with such a support at different longitudinally-spaced positions therealong, at least one of sadi connectors including an integral bifurcated portion the branches of which are separated from one another and means for adjusting the spacing between said branches, the junction of said bifurcated portion and one of the branches of said portion being fixed in relation to different ones of the support and an end of said element, whereby adjustment of said spacing between said branches results in displacement of said end and the support in substantially one direction.

2. On-board vehicle weight transducer apparatus as set forth in claim 1 wherein said bifurcated portion is formed by a slot and an enlarged hole at the closed end of the slot, material between the hole and nearby external surfaces of said connector being of reduced cross-section and thereby forming two relatively deformable flexures one on each side of the slot.

3. On-board vehicle weight transducer apparatus as set forth in claim 1 wherein siad junction is fixed in relation to an end of said element, and wherein said securing means mounts one of said branches in fixed relation to the support at one of the longitudinally-spaced positions therealong.

4. On-board vehicle weight transducer apparatus as set forth in claim 3 wherein said junction is integrally united with said end of said element, wherein said means for adjusting the spacing between said branches comprises a nut and bolt for adjustably drawing said branches closer together, and wherein said bolt further mounts said one of said branches in said fixed relation to the support.

5. On-board vehicle weight transducer apparatus as set forth in claim 1 wherein said one of said branches is fixed in relation to an end of said element, and wherein said securing means mounts said junction in fixed relation to the support at one of said positions.

6. On-board vehicle weight transducer apparatus as set forth in claim 5 wherein said one of said branches in integrally united with said end of said element, and wherein said means for adjusting said spacing between said branches comprises a set screw threadedly engaged with one of said branches and having an end abutting the other of said branches, whereby adjustment of said set screw adjustably spreads said branches apart.

7. On-board vehicle weight transducer apparatus as set forth in claim 1 for use with such a support which includes a pair of lugs externally thereof and integrally therewith, one at each of the spaced positions and in substantially horizontal alignment, and wherein said securing means secures said connectors to the external lugs of the support, the one of said junction and branches which is fixed in relation to the said end of said element being integrally united therewith.

8. On-board vehicle weight transducer apparatus as set forth in claim 7 for use with such a support in which the lugs are substantially aligned with a horizontal plane including the neutral axis of the support, and wherein both of said connectors include an integral bifurcated portion and are substantially the same.

* * * * *